(12) United States Patent
Thongrattana et al.

(10) Patent No.: US 8,964,179 B2
(45) Date of Patent: Feb. 24, 2015

(54) METHOD AND APPARATUS FOR MEASURING A PITCH STATIC ATTITUDE OF A HEAD STACK ASSEMBLY

(71) Applicant: Western Digital Technologies, Inc., Irvine, CA (US)

(72) Inventors: Chaiya Thongrattana, Donmuang (TH); Angkhan Thongsuksai, Thunyaburi (TH); Phatrasiri Rungsang, Klonglaung (TH); Panuwat Rodchom, Phomburi (TH); Porntep Prangprasit, Uthai (TH)

(73) Assignee: Western Digital Technologies, Inc., Irvine, CA (US)

( * ) Notice: Subject to any disclaimer, the term of this patent is extended or adjusted under 35 U.S.C. 154(b) by 177 days.

(21) Appl. No.: 13/773,422

(22) Filed: Feb. 21, 2013

(65) Prior Publication Data

US 2014/0233032 A1 Aug. 21, 2014

(51) Int. Cl.
*G01B 11/14* (2006.01)
*G01B 11/26* (2006.01)
*G01C 1/00* (2006.01)
*G01B 11/00* (2006.01)
*G11B 21/24* (2006.01)

(52) U.S. Cl.
CPC ..................................... *G11B 21/24* (2013.01)
USPC ................... 356/400; 356/139.03; 356/139.1; 356/614

(58) Field of Classification Search
None
See application file for complete search history.

(56) References Cited

U.S. PATENT DOCUMENTS

| | | | |
|---|---|---|---|
| 5,636,013 A | * | 6/1997 | Swift ........................... 356/3.03 |
| 6,049,973 A | | 4/2000 | Frank, Jr. et al. |
| 6,154,952 A | | 12/2000 | Tangren |
| 6,467,153 B2 | | 10/2002 | Butts et al. |
| 6,651,192 B1 | | 11/2003 | Viglione et al. |
| 6,657,801 B1 | | 12/2003 | Chue et al. |
| 6,687,093 B1 | | 2/2004 | Butler et al. |
| 6,710,978 B2 | | 3/2004 | Holaway et al. |
| 6,747,267 B1 | * | 6/2004 | Balasubramaniam ........ 250/225 |
| 6,751,041 B1 | | 6/2004 | Codilian et al. |
| 6,788,480 B1 | | 9/2004 | Codilian et al. |
| 6,791,782 B1 | | 9/2004 | Codilian et al. |

(Continued)

FOREIGN PATENT DOCUMENTS

JP 2008-146729 6/2008

OTHER PUBLICATIONS

International Search Report and Written Opinion dated May 27, 2014 for related PCT Application No. PCT/US2014/017499, pp. 1-9.

*Primary Examiner* — Gordon J Stock, Jr.

(57) ABSTRACT

A tester including a laser transmitter, a laser receiver, a zero reference plane located between the laser transmitter and the laser receiver, a tower reference plane located between the laser transmitter and the laser receiver, wherein the tower reference plane defines an aperture, and a controller. The controller is configured to measure a pitch static attitude of a head stack assembly by at least determining a zero axis, determining a first horizontal position of the aperture and a second horizontal position of the aperture, determining a mid-point of a first slider of the head stack assembly, determining a first vertical position of the aperture, determining a first horizontal line, and generating a pitch static attitude reference line corresponding to a pitch static attitude of the first slider based on a least squares approximation using the mid-point of the first slider and the first horizontal line.

20 Claims, 10 Drawing Sheets

(56) References Cited

U.S. PATENT DOCUMENTS

| | | | |
|---|---|---|---|
| 6,792,669 | B2 | 9/2004 | Codilian |
| 6,798,592 | B1 | 9/2004 | Codilian et al. |
| 6,837,092 | B1 * | 1/2005 | Ubl et al. .................... 72/342.1 |
| 6,894,861 | B1 | 5/2005 | Codilian et al. |
| 6,897,393 | B1 | 5/2005 | Codilian et al. |
| 6,898,044 | B1 | 5/2005 | Chheda |
| 6,943,972 | B1 | 9/2005 | Chue et al. |
| 7,003,626 | B1 | 2/2006 | Chheda et al. |
| 7,009,801 | B2 | 3/2006 | Pit et al. |
| 7,027,141 | B2 | 4/2006 | Girard et al. |
| 7,027,242 | B1 | 4/2006 | Terrill et al. |
| 7,046,467 | B1 | 5/2006 | Chheda |
| 7,058,759 | B1 | 6/2006 | Reiser et al. |
| 7,072,129 | B1 | 7/2006 | Cullen et al. |
| 7,076,391 | B1 | 7/2006 | Pakzad et al. |
| 7,076,603 | B1 | 7/2006 | Chheda |
| 7,136,242 | B1 | 11/2006 | Chue et al. |
| 7,139,145 | B1 | 11/2006 | Archibald et al. |
| 7,145,744 | B1 | 12/2006 | Clawson et al. |
| 7,156,139 | B2 * | 1/2007 | Yao .................... 156/351 |
| 7,178,432 | B1 | 2/2007 | Han et al. |
| 7,194,795 | B2 | 3/2007 | Jenneke |
| 7,199,959 | B1 | 4/2007 | Bryant |
| 7,203,020 | B1 | 4/2007 | Viglione et al. |
| 7,206,171 | B2 * | 4/2007 | Okawara .................... 360/245.5 |
| 7,209,310 | B1 | 4/2007 | Tsai et al. |
| 7,213,433 | B2 * | 5/2007 | Ubl et al. .................... 72/342.1 |
| 7,222,410 | B1 | 5/2007 | Klassen et al. |
| 7,236,911 | B1 | 6/2007 | Gough et al. |
| 7,269,525 | B1 | 9/2007 | Gough et al. |
| 7,433,023 | B2 * | 10/2008 | Swift et al. .................... 356/4.01 |
| 7,458,282 | B1 | 12/2008 | Wuester, Sr. et al. |
| 7,490,398 | B1 | 2/2009 | Klassen et al. |
| 7,506,553 | B1 | 3/2009 | Panyavoravaj |
| 7,549,204 | B1 | 6/2009 | Vangal-Ramamurthy et al. |
| 7,552,526 | B1 | 6/2009 | Klassen et al. |
| 7,559,590 | B1 | 7/2009 | Jones |
| 7,561,416 | B1 | 7/2009 | Sarraf |
| 7,596,722 | B1 | 9/2009 | Pakzad et al. |
| 7,617,737 | B2 | 11/2009 | Zhu et al. |
| 7,634,375 | B1 | 12/2009 | Pakzad et al. |
| 7,653,983 | B1 | 2/2010 | Klassen |
| 7,656,540 | B2 | 2/2010 | Girard |
| 7,669,711 | B1 | 3/2010 | Westwood |
| 7,671,599 | B1 | 3/2010 | Tan et al. |
| 7,673,638 | B1 | 3/2010 | Boynton et al. |
| 7,690,705 | B1 | 4/2010 | Roberts et al. |
| 7,743,486 | B1 | 6/2010 | Klassen et al. |
| 7,764,387 | B2 | 7/2010 | Girard et al. |
| 7,817,259 | B2 | 10/2010 | Smith et al. |
| 7,863,889 | B1 | 1/2011 | Bamrungtham |
| 7,869,182 | B1 | 1/2011 | Tan et al. |
| 7,869,183 | B1 | 1/2011 | Tan et al. |
| 7,874,424 | B1 | 1/2011 | Westwood |
| 7,896,218 | B2 | 3/2011 | Rakpongsiri et al. |
| 7,900,272 | B1 | 3/2011 | Tan et al. |
| 7,912,666 | B1 | 3/2011 | Pakzad et al. |
| 7,916,599 | B1 | 3/2011 | Panyavoravaj et al. |
| 7,921,543 | B2 | 4/2011 | Trongjitwikrai et al. |
| 7,940,487 | B1 | 5/2011 | Krishnan et al. |
| 7,974,038 | B2 | 7/2011 | Krishnan et al. |
| 7,980,159 | B1 | 7/2011 | Han |
| 7,987,585 | B1 | 8/2011 | Klassen et al. |
| 8,066,171 | B1 | 11/2011 | Rakpongsiri et al. |
| 8,078,421 | B1 | 12/2011 | Shastry et al. |
| 8,092,610 | B1 | 1/2012 | Tarrant |
| 8,094,414 | B1 | 1/2012 | Cheng et al. |
| 8,098,460 | B1 | 1/2012 | Jen et al. |
| 8,127,643 | B1 | 3/2012 | Tan |
| 8,135,208 | B1 | 3/2012 | Vangal-Ramamurthy |
| 8,162,366 | B1 | 4/2012 | Tan et al. |
| 8,168,033 | B1 | 5/2012 | Mohamad Nor |
| 8,180,487 | B1 | 5/2012 | Vangal-Ramamurthy et al. |
| 8,199,425 | B1 | 6/2012 | Gustafson et al. |
| 8,218,256 | B1 | 7/2012 | Lin et al. |
| 8,223,448 | B1 | 7/2012 | Haw et al. |
| 8,230,570 | B1 | 7/2012 | Choong |
| 8,245,601 | B1 | 8/2012 | Hastama et al. |
| 8,267,831 | B1 | 9/2012 | Olsen et al. |
| 8,270,118 | B1 | 9/2012 | Cheng et al. |
| 8,300,338 | B1 | 10/2012 | McFadyen |
| 8,307,537 | B1 | 11/2012 | Klassen et al. |
| 8,312,585 | B1 | 11/2012 | Tarrant |
| 8,322,235 | B1 | 12/2012 | Keopuang et al. |
| 8,327,529 | B1 | 12/2012 | Tan et al. |
| 8,335,049 | B1 | 12/2012 | Liu et al. |
| 8,345,367 | B1 | 1/2013 | Tharumalingam |
| 8,356,384 | B1 | 1/2013 | Ferre et al. |
| 8,369,073 | B2 | 2/2013 | Trinh et al. |
| 8,379,363 | B1 | 2/2013 | Kolunthavelu et al. |
| 8,387,631 | B1 | 3/2013 | Thonghara et al. |
| 8,424,418 | B1 | 4/2013 | Wuester, Sr. et al. |
| 8,424,824 | B1 | 4/2013 | Tan et al. |
| 8,432,630 | B1 | 4/2013 | Lin et al. |
| 8,432,631 | B1 | 4/2013 | Lin et al. |
| 8,447,430 | B1 | 5/2013 | Tan et al. |
| 8,447,551 | B1 | 5/2013 | Ong et al. |
| 8,451,578 | B1 | 5/2013 | Tan et al. |
| 8,453,841 | B1 | 6/2013 | James et al. |
| 8,454,755 | B1 | 6/2013 | Tan et al. |
| 8,485,772 | B1 | 7/2013 | Ismail et al. |
| 8,493,681 | B1 | 7/2013 | Selvaraj |
| 8,537,480 | B1 | 9/2013 | Haw |
| 8,544,164 | B1 | 10/2013 | Cheng et al. |
| 8,547,657 | B1 | 10/2013 | Liu et al. |
| 8,553,968 | B1 | 10/2013 | Lee et al. |
| 8,561,285 | B1 | 10/2013 | Vangal-Ramamurthy et al. |
| 8,565,511 | B1 | 10/2013 | Sungkhaphong et al. |
| 8,582,229 | B1 | 11/2013 | Krishnan |
| 8,596,107 | B1 | 12/2013 | Wongdao et al. |
| 8,605,383 | B1 | 12/2013 | Wang et al. |
| 8,640,328 | B1 | 2/2014 | Yow et al. |
| 8,650,716 | B1 | 2/2014 | Methe et al. |
| 8,653,824 | B1 | 2/2014 | Liu et al. |
| 8,662,554 | B1 | 3/2014 | Srisupun et al. |
| 8,683,676 | B1 | 4/2014 | Wuester, Sr. et al. |
| 8,689,433 | B1 | 4/2014 | Choong |
| 8,707,531 | B1 | 4/2014 | Sungkhaphong et al. |
| 8,713,333 | B1 | 4/2014 | Selvaraj |
| 8,763,790 | B1 | 7/2014 | Neamsuwan et al. |
| 8,789,446 | B1 | 7/2014 | Sungkhaphong et al. |
| 2004/0231139 | A1 | 11/2004 | Jurgenson |
| 2006/0002028 | A1 | 1/2006 | Nayar et al. |
| 2008/0062411 | A1 | 3/2008 | Smith et al. |
| 2008/0084630 | A1 | 4/2008 | Trongjitwikrai et al. |
| 2008/0151430 | A1 | 6/2008 | Zhu et al. |
| 2009/0157848 | A1 | 6/2009 | Khoo |
| 2010/0108256 | A1 | 5/2010 | Roajanasiri et al. |
| 2013/0057986 | A1 | 3/2013 | Vangal-Ramamurthy et al. |
| 2013/0248545 | A1 | 9/2013 | Thongjitti et al. |

\* cited by examiner

METHOD AND APPARATUS FOR MEASURING A PITCH STATIC ATTITUDE OF A HEAD STACK ASSEMBLY

BACKGROUND

A conventional disk drive includes a head stack assembly to read and write data to and from a magnetic rotating disk. The head stack assembly includes one or more sliders. Generally, the slider should be substantially level relative to the magnetic rotating disk. If the slider of the head stack assembly is tilted too much, the slider may not read and write data to and from the magnetic rotating disk correctly. Thus, prior to installation of the head stack assembly in the disk drive, the head stack assembly is tested or calibrated using a conventional tester to determine a pitch static attitude of the head stack assembly.

The conventional tester transmits and receives laser beams to determine the pitch static attitude of the head stack assembly. The measurement of the laser beams are calibrated using a reference plane. Furthermore, some of the laser beams are blocked by a mask to prevent all of the laser beams from reaching the laser receiver. However, the reference plane and the mask may be separate units. In such a case independent movement of the reference plane and the mask may cause errors.

Furthermore, calibration with just the reference plane may provide inaccurate measurements for sliders of the head stack assembly. In addition, conventional collection of data for determination of a pitch static attitude of a head stack assembly may also be inadequate.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
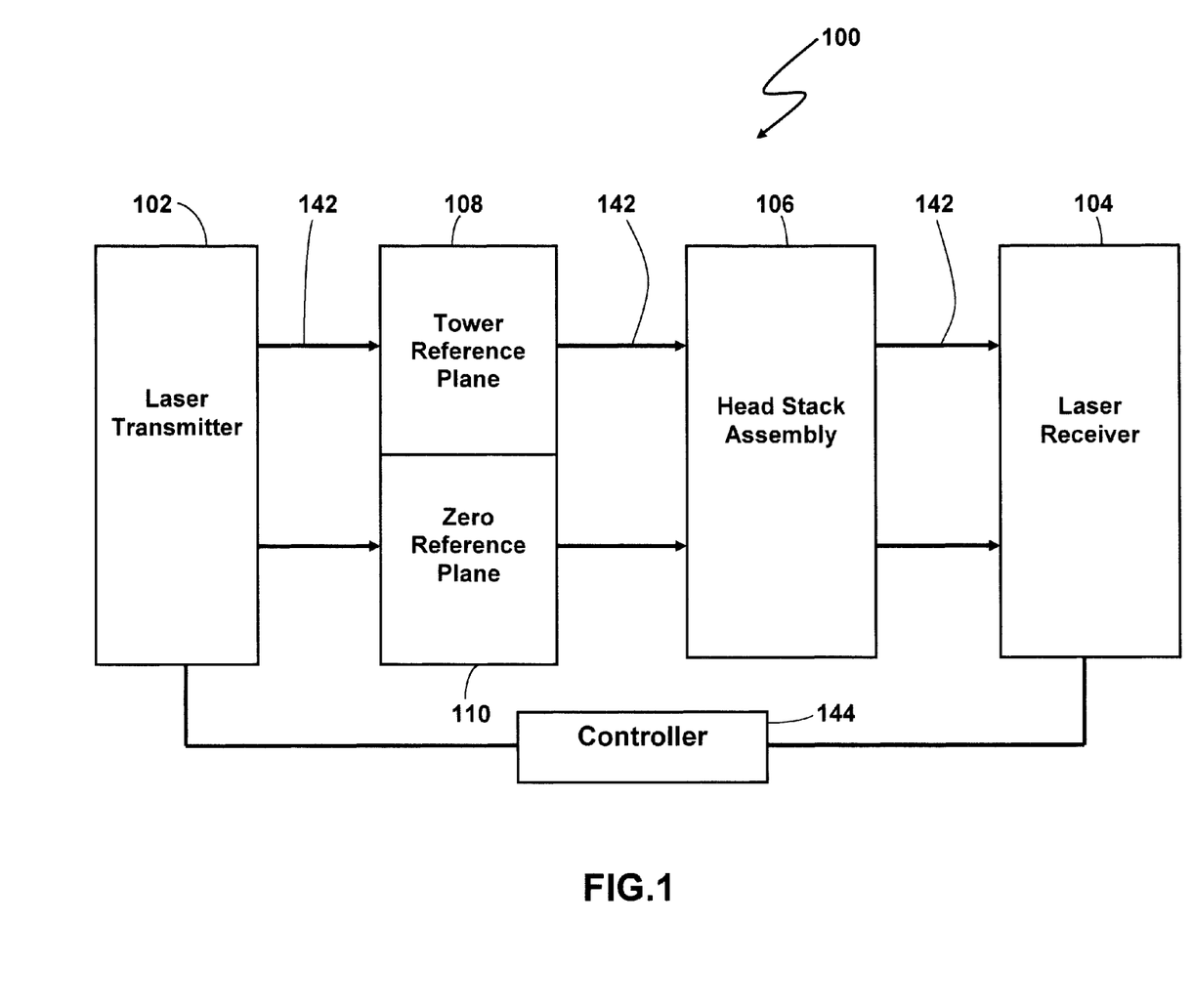
FIG. 1 depicts a tester according to an embodiment.

In an embodiment, as shown in FIG. 1, a tester 100 includes a laser transmitter 102, a laser receiver 104, a tower reference plane 108, a zero reference plane 110, and a controller 144. In an embodiment, a head stack assembly 106 is placed between the laser transmitter 102 and the laser receiver 104. The head stack assembly 106 can be, for example, a head stack assembly for a disk drive. In addition, the head stack assembly 106 can include one or more head stack assemblies. In an embodiment, the disk drive includes a magnetic rotating disk.

In an embodiment, the tower reference plane 108 and the zero reference plane 110 are located between the head stack assembly 106 and the laser transmitter 102. In an embodiment, the tower reference plane 108 and the zero reference plane 110 are integrally formed. This can reduce, for example, errors caused by independent movement of the tower reference plane 108 and the zero reference plane 110.

In an embodiment, the laser transmitter 102 is configured to transmit laser beams 142 and the laser receiver 104 is configured to receive the laser beams 142 from the laser receiver 104. In an embodiment, the laser transmitter 102 is a charge coupled device laser transmitter, and the laser receiver 104 is a charge coupled device laser receiver. The laser transmitter 102, the laser receiver 104 and the laser beams 142 are used to perform auto gage verification of the tester 100, and also to determine a pitch static attitude of the head stack assembly 106.

In an embodiment, to perform auto gage verification, the laser transmitter 102 transmits laser beams 142 to the laser receiver 104 with relevant portions of the tower reference plane 108 and the zero reference plane 110 blocking some of the laser beams 142. In an embodiment, to determine the pitch static attitude of the of the head stack assembly 106, the laser transmitter 102 transmits laser beams 142 to the laser receiver 104 with relevant portions of the head stack assembly 106 blocking some of the laser beams 142. In an embodiment, the controller 144 is configured to control the laser transmitter 102 and the laser receiver 104 to perform auto gage verification of the tester 100 and to determine the pitch static attitude of the head stack assembly 106, which will be described in more detail later.

Figure 2:
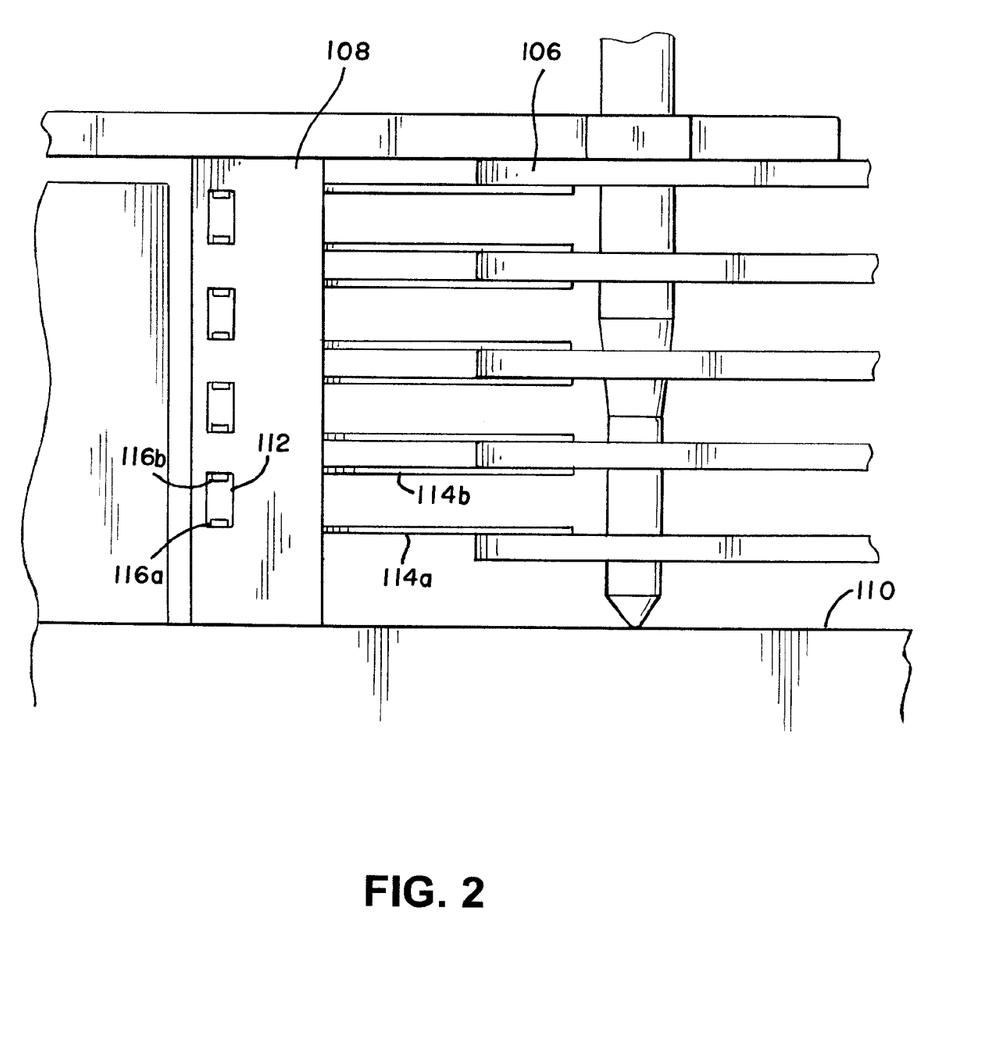
FIG. 2 depicts a first side view of a head stack assembly, a tower reference plane, and a zero reference plane according to an embodiment.
Figure 3:
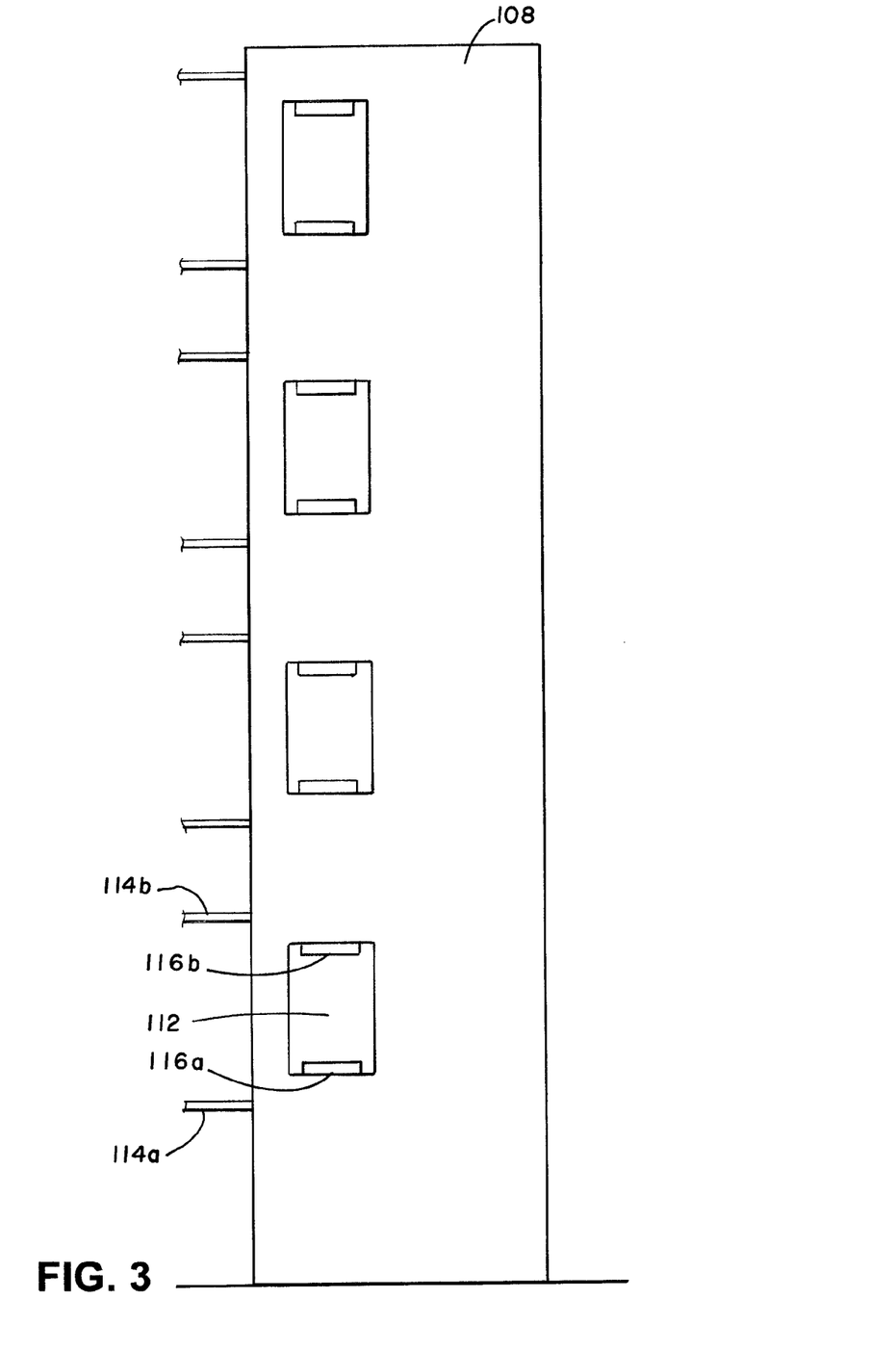
FIG. 3 depicts a first side view of a head stack assembly, a tower reference plane, and a zero reference plane according to an embodiment.

In embodiments shown in FIGS. 2 and 3, a first side view of the head stack assembly 106, the tower reference plane 108 and the zero reference plane 110 are shown. In an embodiment shown in FIG. 2, the zero reference plane 110 is located generally along a horizontal axis, such as an X-axis, while the tower reference plane 108 is generally located along a vertical axis, such as a Y-axis. In an embodiment, as shown in FIG. 2, the tower reference plane comprises apertures such as an aperture 112 while the head stack assembly 106 comprises sliders such as sliders 116a and 116b which can be seen through the aperture 112. In an embodiment, the slider 116b is located in a vertical direction opposite the slider 116a. The head stack assembly 106 also comprises load beams, such as load beams 114a and 114b. A closer first side view of the head stack assembly 106 and the tower reference plane 108 is shown in an embodiment in FIG. 3.

Figure 4:
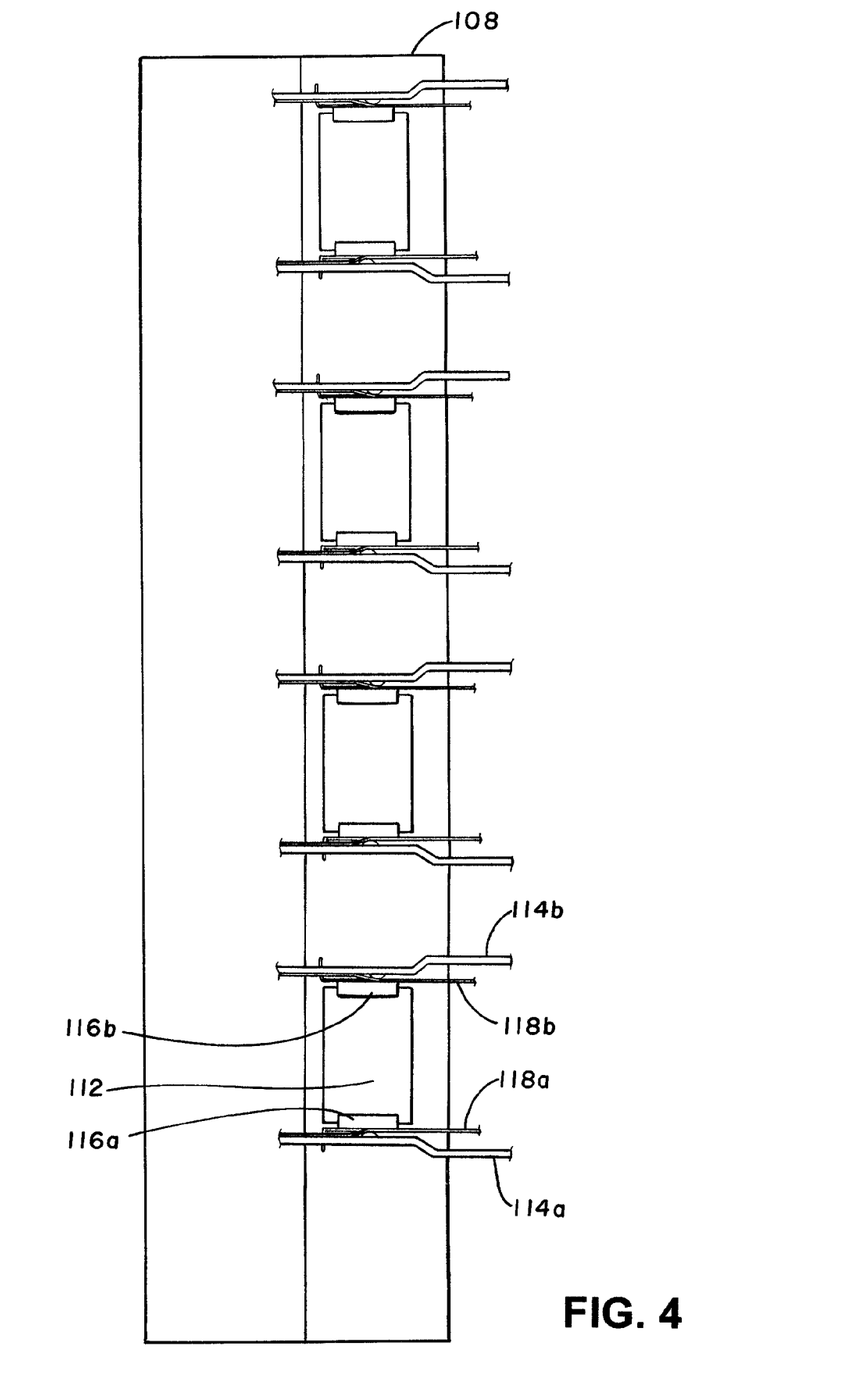
FIG. 4 depicts a second side view of a head stack assembly, a tower reference plane, and a zero reference plane according to an embodiment.
Figure 5:
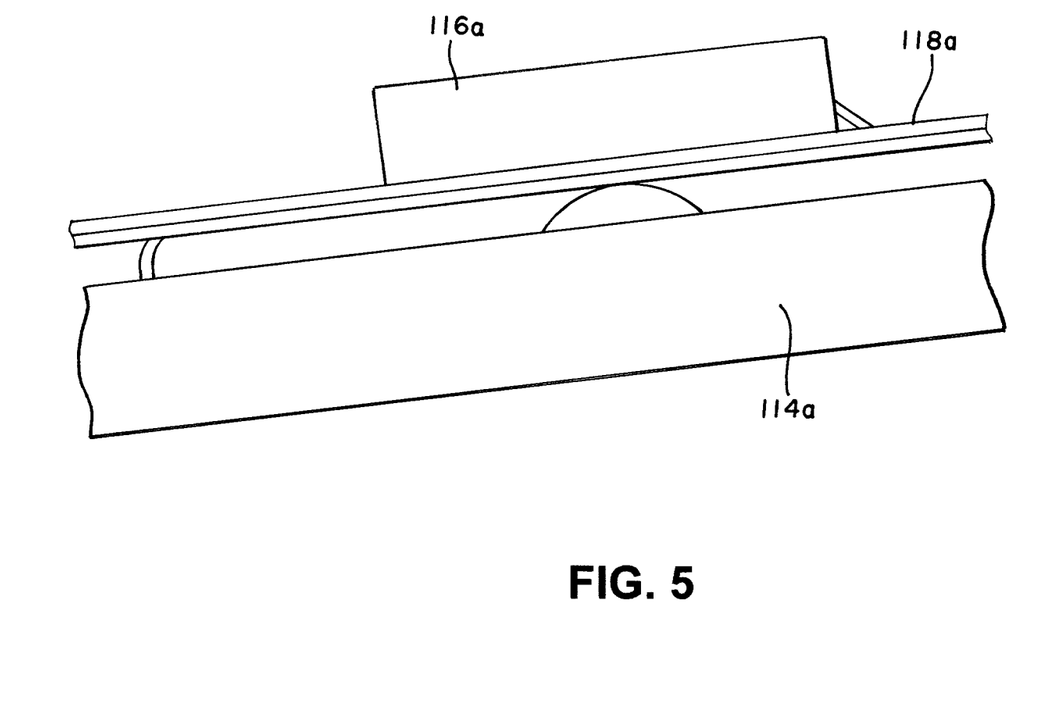
FIG. 5 depicts a slider, a flexure, and a load beam according to an embodiment.

In an embodiment shown in FIG. 4, a second side view opposite the first side view of the head stack assembly 106 and the tower reference plane 108 are shown. As seen in FIG. 4, the head stack assembly 106 also comprises flexures such as flexures 146a and 146b. In an embodiment, shown in FIG. 5, a closer view of the slider 116a, the flexure 146a, and the load beam 114a are shown.

Figure 6:
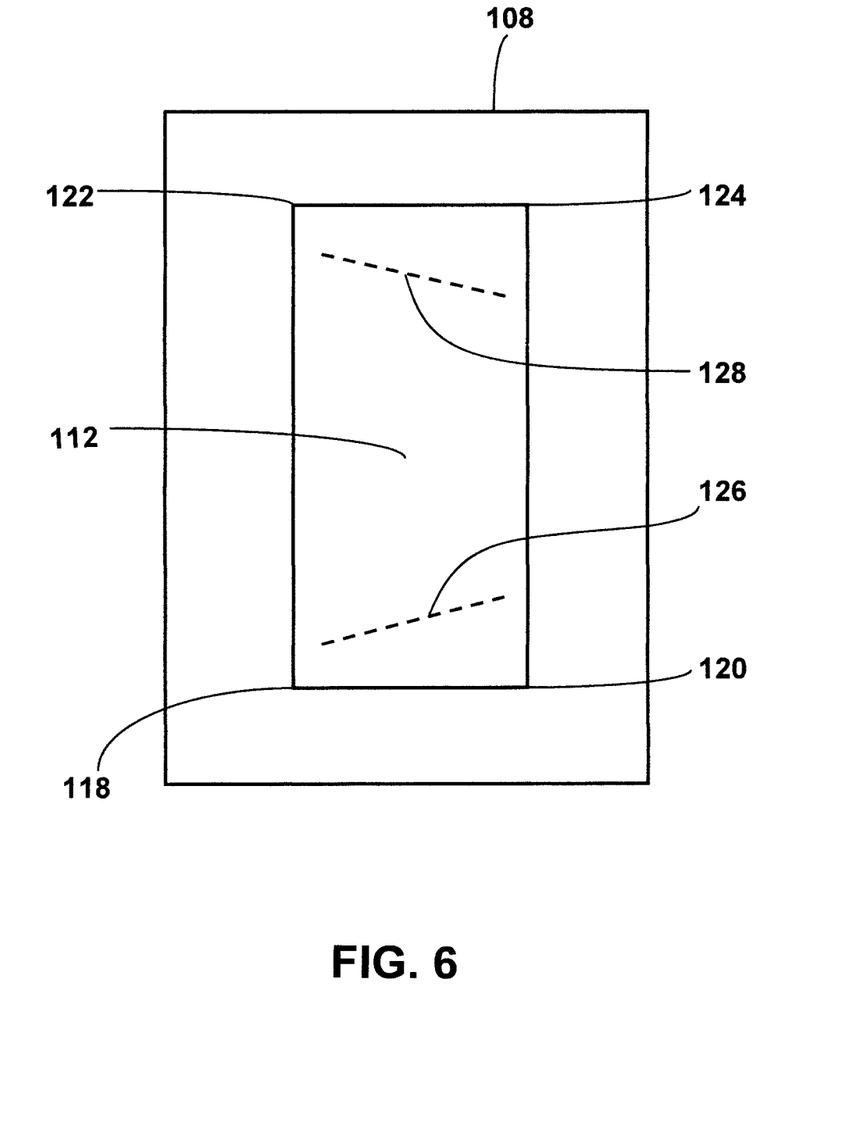
FIG. 6 depicts an aperture of a tower reference plane according to an embodiment.

In an embodiment shown in FIG. 6, the aperture 112 comprises corners 118, 120, 122, and 124. The controller 144 can utilize the aperture 112 to perform auto gage verification of the tester 100. In an embodiment, the controller 144 can also utilize the corners 118, 120, 122, and 124 to determine a pitch static attitude reference line 126 for the slider 116a and a pitch static attitude reference line 128 for the slider 116*b*. In an embodiment, the pitch static attitude reference line 126 corresponds to a pitch static attitude of the slider 116*a* and the pitch static attitude reference line 128 corresponds to a pitch static attitude of the slider 116*b*.

Figure 7:
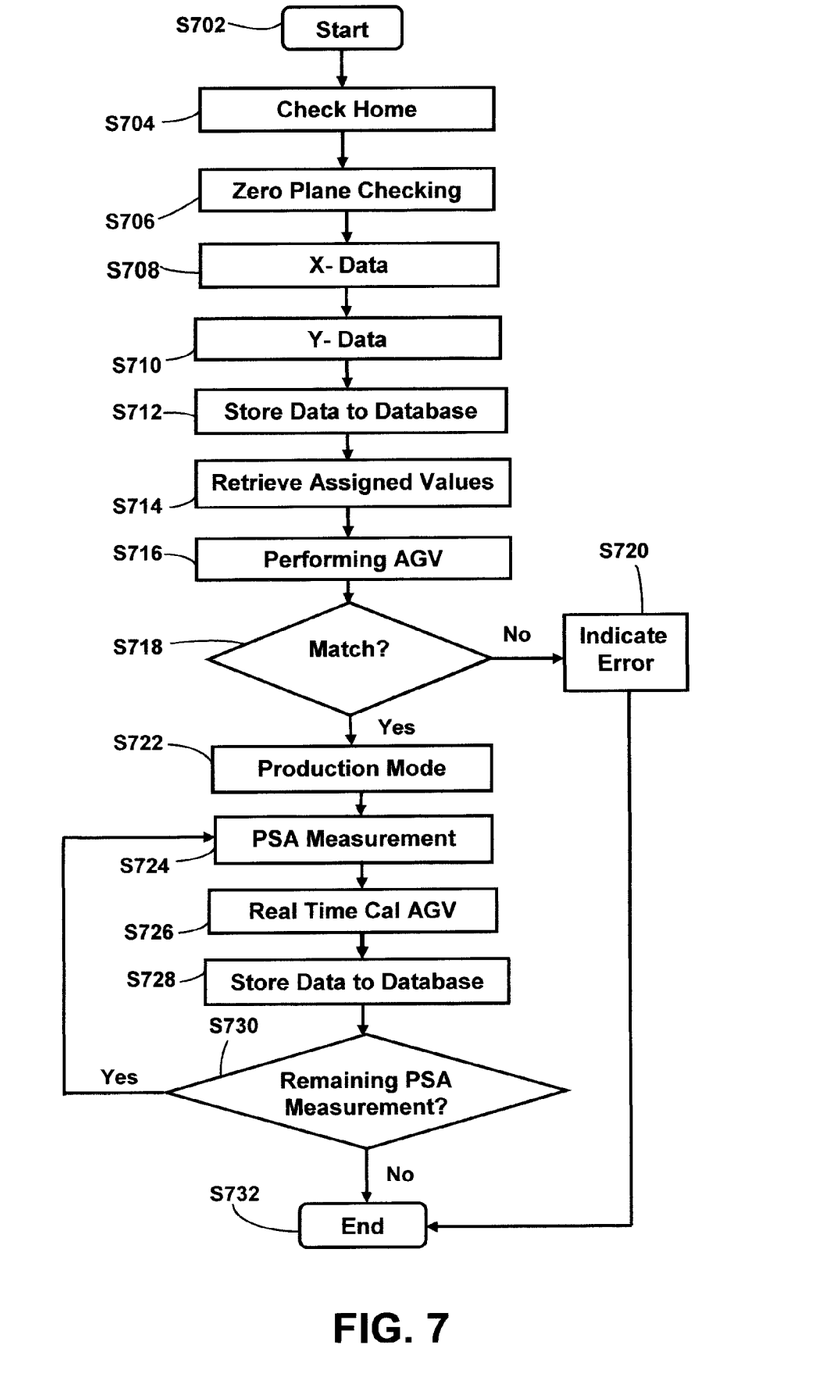
FIG. 7 depicts a process for performing auto gage verification and determining a pitch static attitude of a head stack assembly according to an embodiment.
Figure 8:
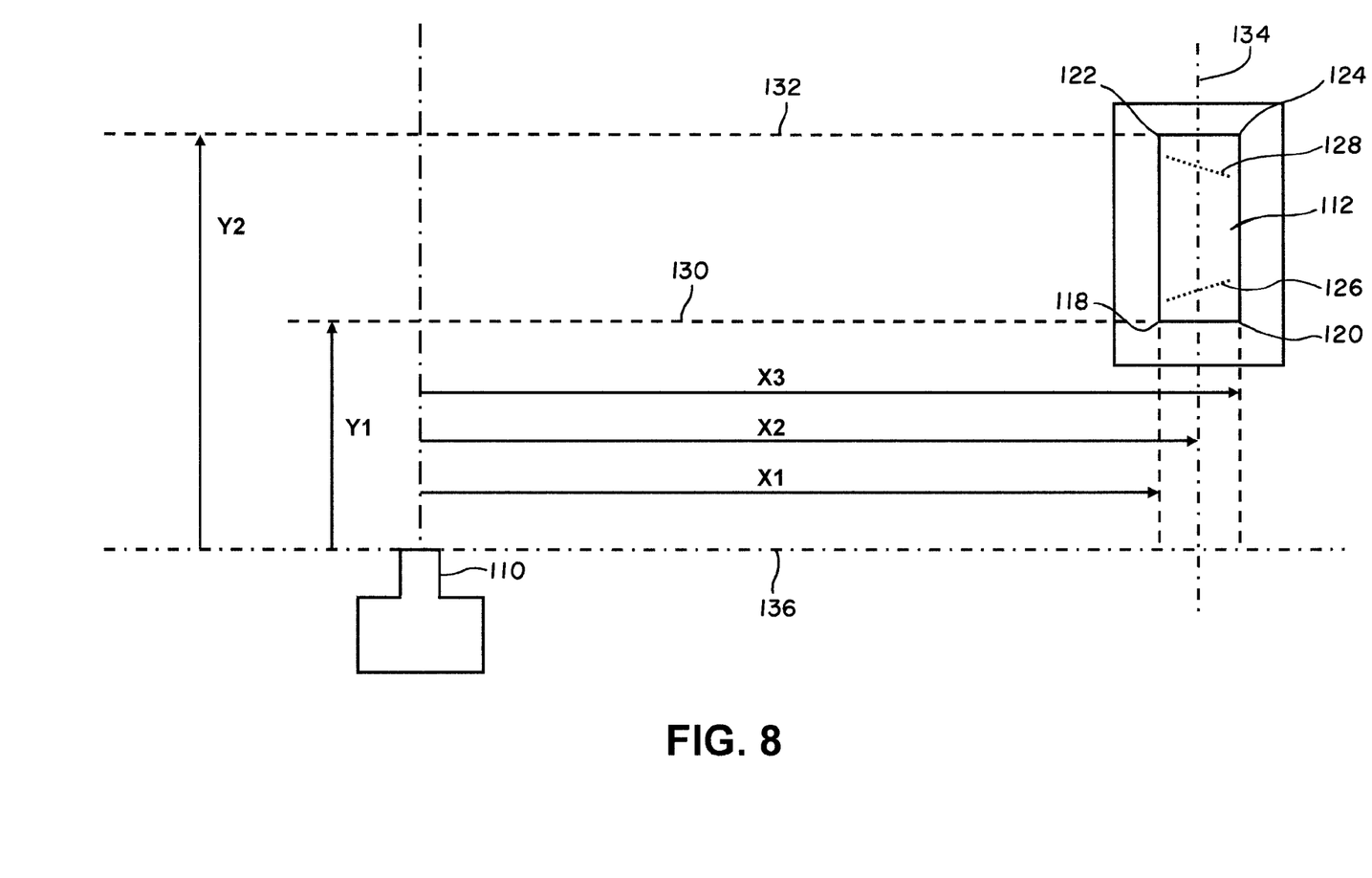
FIG. 8 depicts an aperture of a tower reference plane and a zero reference plane according to an embodiment.

In an embodiment, the controller 144 is configured to perform a process shown in FIG. 7 to perform auto gage verification of the tester 100 and to determine a pitch static attitude of the head stack assembly 106. In block S702, the process starts. In block S704, the controller 144 checks home. For example, the controller 144 controls the laser transmitter 102 to return to a home position such that the laser transmitter 102 can perform auto gage verification. In block S706 the controller 144 performs a zero plane checking process. For example, in embodiments shown in FIGS. 1 and 8, the controller 144 scans for and determines a location of the zero reference plane 110 using the laser beams. In an embodiment, the zero reference plane 110 is used to determine a zero axis.

In block S708, the controller 144 gathers X-data. The X-data can be, for example, horizontal data of portions of the aperture 112. For example, the controller 144 can utilize the laser transmitter 102, the laser receiver 104, and the laser beams 142 to determine horizontal positions of the corners 118, 120, 122, and 124 as shown in an embodiment in FIG. 8. In an embodiment shown in FIG. 8, the horizontal position of the corner 118 is indicated by X1, while the horizontal position of the corner 120 is indicated by X3. Similarly, in an embodiment, the horizontal position of the corner 122 is indicated by X1 and the horizontal position of the corner 124 is indicated by X3. In an embodiment, the horizontal position indicated by X1 is in a horizontal direction opposite the horizontal position indicated by X3.

In block S710, the controller 144 gathers Y-data. The Y-data can be, for example, vertical data of portions of the aperture 112. For example, the controller 144 can utilize the laser transmitter 102, the laser receiver 104, and the laser beams 142 to determine vertical positions of the corners 118, 120, 122, and 124 as shown in an embodiment in FIG. 8. In an embodiment shown in FIG. 8, the vertical position of the corner 118 is indicated by Y1, while the vertical position of the corner 122 is indicated by Y2. Similarly, in an embodiment, the vertical position of the corner 120 is indicated by Y1 and the vertical position of the corner 124 is indicated by Y2. In an embodiment, the vertical position indicated by Y1 is located in a vertical direction opposition the vertical direction indicated by Y2.

In block S712, the controller 144 stores the gathered X-data and Y-data to a database such as an engineering database. In an embodiment, the database is accessible by the controller 144. In an embodiment, the database is located in a remote system accessible by the controller 144.

In block S714, the controller 144 retrieves assigned values from the database. In an embodiment, the retrieved assigned values are assigned horizontal and vertical positions of the corners 118, 120, 122, and 124. In an embodiment, the assigned horizontal and vertical positions indicate the expected or correct positions of the horizontal and vertical positions of portions of the aperture 112, such as the corners 118, 120, 122, and 124.

In block S716, the controller 144 performs auto gage verification by comparing the X-data and the Y-data to the assigned horizontal and vertical positions of the corners 118, 120, 122, and 124.

In block S718, the controller 144 determines whether the horizontal positions of the corners 118, 120, 122, and 124 (gathered as X-data) matches the assigned horizontal positions of the corners 118, 120, 122, and 124 and whether the vertical positions of the corners 118, 120, 122, and 124 (gathered as Y-data) matches the assigned vertical positions of the corners 118, 120, 122, and 124.

In an embodiment, when the horizontal positions of the corners 118, 120, 122, or 124 (gathered as part of the X-data) do not match the assigned horizontal positions of the corners 118, 120, 122, or 124, the controller 144 indicates a tester failure in block S720. In an embodiment, when the vertical position of the corners 118, 120, 122, or 124 (gathered as part of the Y-data) do not match the assigned vertical positions of the corners 118, 120, 122, or 124, the controller 144 indicates a tester failure in block S720. In an embodiment, after a tester failure has been indicated in block S720, the process ends in block S732. In an embodiment, one or more blocks S702-S720 may be repeated for one or more of the remaining apertures in the tower reference plane 108.

In an embodiment, when the controller 144 indicates a tester failure, the tester 100 can be withheld from production. However, if the controller 144 determines that there is no tester failure in block S716, the tester 100 can be placed in production mode in block S722.

In block S724, the controller 144 performs pitch static attitude measurements on the head stack assembly 106 as seen in embodiments shown in FIGS. 1-5, and which will be described in more detail below.

In block S726, the controller 144 performs real time calibration and auto gage verification by utilizing any additional X-data and Y-data gathered in block S724. In an embodiment, the real time calibration and auto gage verification can include performing one or more of blocks S704 to S722 disclosed above. In block S728, the controller 144 stores the additional X-data and Y-data gathered in the database.

In block S730, the controller 144 determines whether there are any remaining pitch static attitude measurements to be performed. When there are still pitch static attitude measurements remaining to be performed, the controller 144 repeats blocks S724-S728. When there are no pitch static attitude measurements remaining to be performed, the process ends in block S732.

Figure 9:
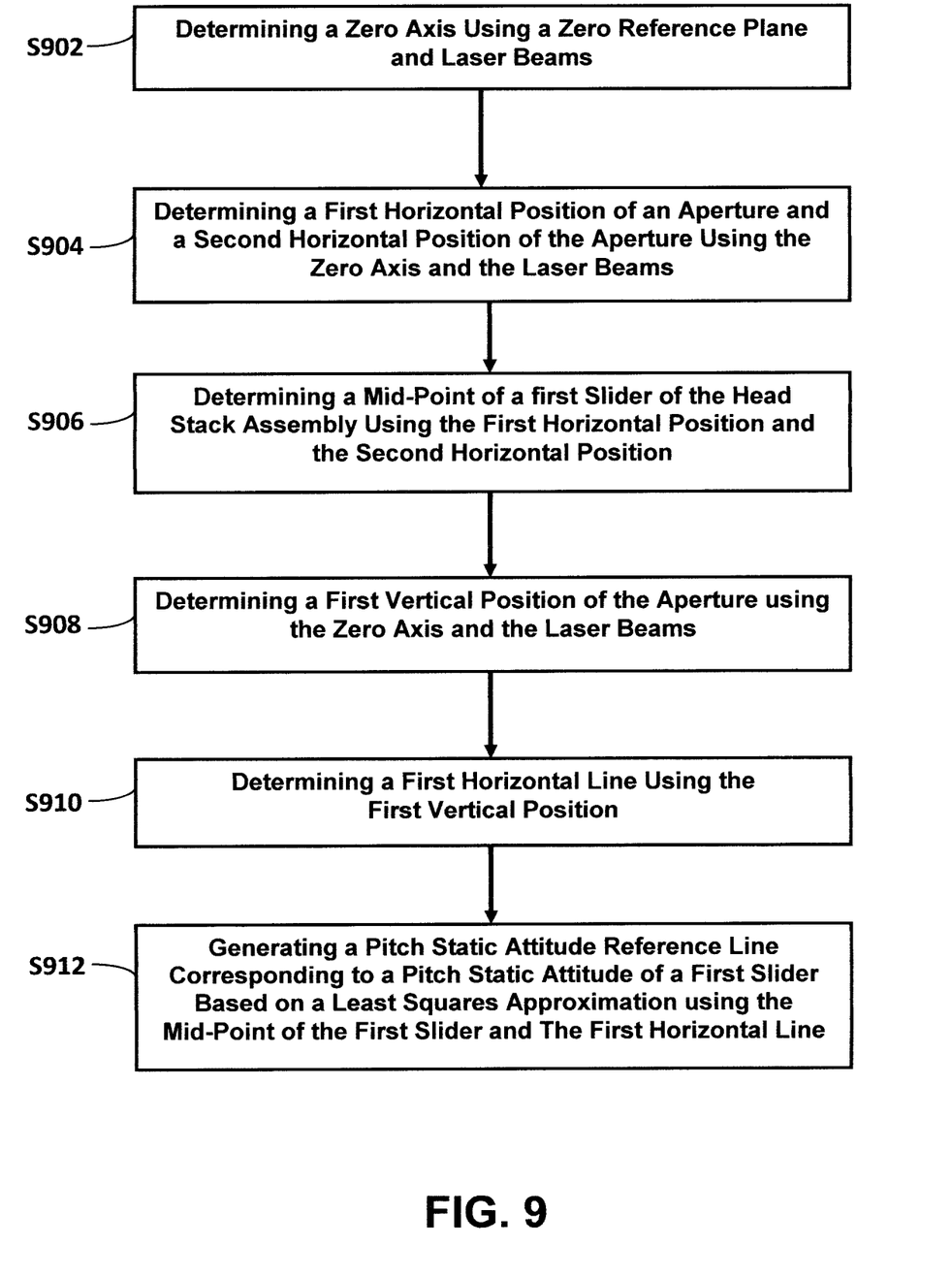
FIG. 9 depicts a process for determining a pitch static attitude of a head stack assembly according to an embodiment.

In an embodiment, a process for performing pitch static attitude measurements on the head stack assembly 106 is shown in FIG. 9. In block S902, the controller 144 determines a zero axis 136 using the zero reference plane 110 and the laser beams 142 as shown in an embodiment in FIG. 8. In block S904, the controller 144 determines a first horizontal position and a second horizontal position of the aperture 112 using the zero axis 136 and the laser beams 142. For example, the controller 144 determines the horizontal position of the corner 118 indicated as X1, and the horizontal position of the corner 120 indicated as X3, as shown in an embodiment in FIG. 8.

In block S906, the controller 144 determines a mid-point of a first slider of the head stack assembly 106 using the first horizontal position of the aperture 112 and the second horizontal position of the aperture 112. For example, as shown in an embodiment in FIG. 8, the controller 144 determines the mid-point of the slider 116*a* using X1 and X3. In the embodiment shown in FIG. 8, the mid-point of the slider 116*a* is indicated as X2 and the line 134. In an embodiment, X2 and the line 134 are an approximation of the mid-point of the slider 116*a*.

In block S908, the controller 144 determines a first vertical position of the aperture 112 using the zero axis 136 and the laser beams 142. For example, the controller 144 determines the vertical position of the corners 118 and 120 (indicated as Y1), using the zero axis 136 and the laser beams 142. In block S910, the controller 144 determines a first horizontal line using the first vertical position. For example, the controller 144 determines the horizontal line 130 using Y1.

In block S912, the controller 144 generates the pitch static attitude reference line corresponding to a pitch static attitude of a first slider based on a least squares approximation using the mid-point of the first slider and the first horizontal line. For example, the controller 144 generates the pitch static attitude reference line 126 corresponding to the pitch static attitude of the slider 116*a* based on a least squares approximation using X2 and the horizontal line 130.

Figure 10:
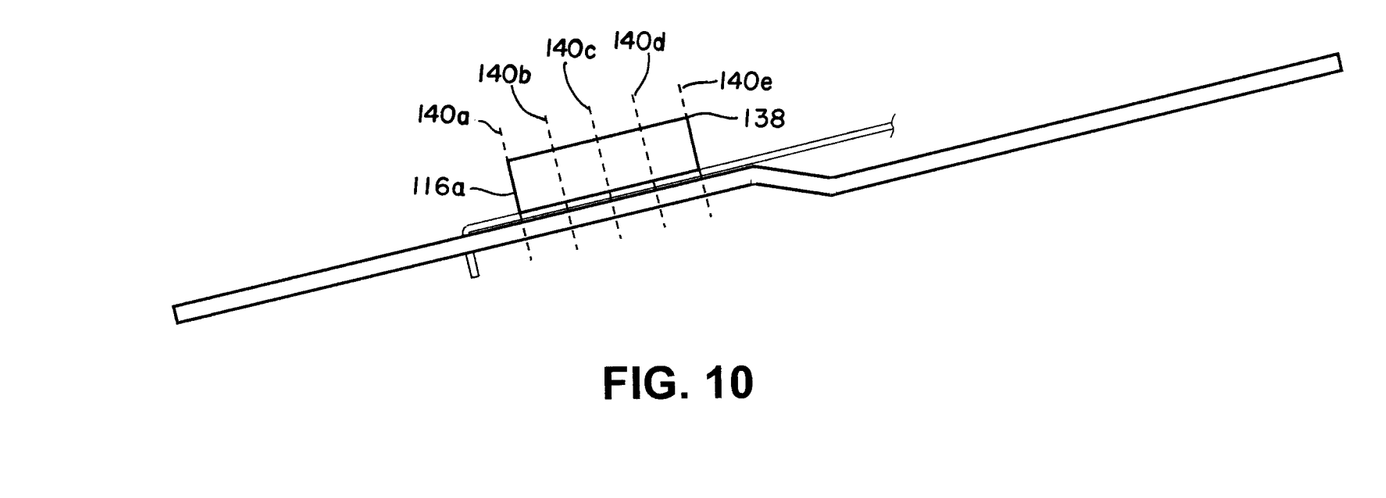
FIG. 10 depicts a slider according to an embodiment.
Figure 11:
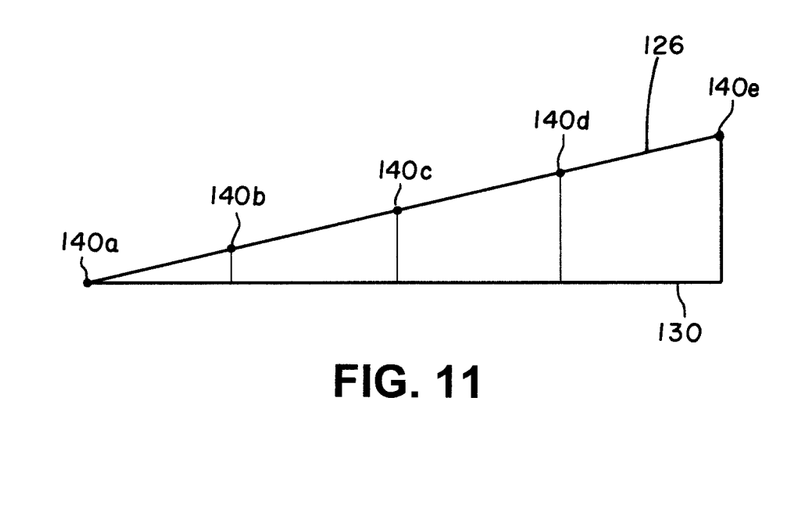
FIG. 11 depicts a pitch static attitude reference line and a horizontal line according to an embodiment.

In an embodiment shown in FIG. 10, the controller 144 utilizes X2 to determine the locations on the slider 116*a* to transmit the laser beams 142 and gather positional data of the slider 116*a*. For example, pitch static attitude data for the slider 116*a* can be gathered at the locations 140*a*-140*e* for a top portion 138 of the slider 116*a*. In an embodiment shown in FIG. 10, the location 140*c* corresponds to the mid-point of the slider 116*a* (X2). Furthermore, in an embodiment shown in FIG. 11, the gathered pitch static attitude data at the locations 140*a*-140*e* can be utilized with the horizontal line 130 to generate the pitch static attitude reference line 126 using the least squares approximation.

In an embodiment, one or more blocks shown in FIG. 9 may be used to generate pitch static attitude reference lines corresponding to the pitch static attitude of additional sliders in the head stack assembly 106. For example, one or more blocks shown in FIG. 9 may be used to generate the pitch static attitude reference line 128 corresponding to the pitch static attitude of the slider 116*b*. In block S902, the controller 144 determines the zero axis 136 using the zero reference plane 110 and the laser beams 142 as shown in an embodiment in FIG. 8. In block S904, the controller 144 determines the horizontal position of the corner 122 indicated as X1 and the horizontal position of the corner 124 indicated as X3, as shown in an embodiment in FIG. 8.

In block S906, the controller 144 determines the mid-point of the slider 116*b* using X1 and X3. In the embodiment shown in FIG. 8, the mid-point of the slider 116*b* is indicated as X2 and the line 134. In block S908, the controller 144 determines the vertical position of the corners 122 and 124 indicated as Y2 in an embodiment shown in FIG. 8. In block S910, the controller 144 determines the horizontal line 132 using Y2.

In block S912, the controller 144 generates the pitch static attitude reference line 128 corresponding to the pitch static attitude of the slider 116*b* based on a least squares approximation using X2 and the horizontal line 132.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A tester for measuring a pitch static attitude of a head stack assembly comprising:
   a laser transmitter configured to transmit laser beams;
   a laser receiver configured to receive the laser beams from the laser transmitter, wherein the laser transmitter and the laser receiver are configured to receive a head stack assembly comprising sliders between the laser transmitter and the laser receiver;
   a zero reference plane located between the laser transmitter and the laser receiver;
   a tower reference plane located between the laser transmitter and the laser receiver, wherein the tower reference plane defines an aperture; and
   a controller configured to measure a pitch static attitude of the head stack assembly by at least:
      determining a zero axis using the zero reference plane and the laser beams;
      determining a first horizontal position of the aperture and a second horizontal position of the aperture using the zero axis and the laser beams;
      determining a mid-point of a first slider of the head stack assembly using the first horizontal position and the second horizontal position;
      determining a first vertical position of the aperture using the zero axis and the laser beams;
      determining a first horizontal line using the first vertical position; and
      generating a pitch static attitude reference line corresponding to a pitch static attitude of the first slider based on a least squares approximation using the mid-point of the first slider and the first horizontal line.

2. The tester of claim 1 wherein the zero reference plane and the tower reference plane are integrally formed.

3. The tester of claim 1 wherein the first horizontal position is located in a horizontal direction opposite the second horizontal position.

4. The tester of claim 1 wherein the controller is further configured to perform auto gage verification by:

determining whether the first horizontal position matches a first assigned horizontal position; and
indicating a tester failure when the first horizontal position does not match the first assigned horizontal position.

5. The tester of claim 1 wherein the controller is further configured to perform auto gage verification by:
determining whether the second horizontal position matches a second assigned horizontal position; and
indicating a tester failure when the second horizontal position does not match the second assigned horizontal position.

6. The tester of claim 1 wherein the controller is further configured to perform auto gage verification by:
determining whether the first vertical position matches a first assigned vertical position; and
indicating a tester failure when the first vertical position does not match the first assigned vertical position.

7. The tester of claim 1 wherein the controller is further configured to measure a pitch static attitude of the head stack assembly by:
determining a mid-point of a second slider of the head stack assembly using the first horizontal position and the second horizontal position;
determining a second vertical position of the aperture using the zero axis and the laser beams;
determining a second horizontal line using the second vertical position; and
generating a pitch static attitude reference line corresponding to a pitch static attitude of the second slider based on a least squares approximation using the mid-point of the second slider and the second horizontal line.

8. The tester of claim 7 wherein the first vertical position is located in a vertical direction opposite the second vertical position.

9. The tester of claim 7 wherein the second slider is located in a vertical direction opposite the first slider.

10. The tester of claim 7 wherein the controller is further configured to perform auto gage verification by:
determining whether the second vertical position matches a second assigned vertical position; and
indicating a tester failure when the second vertical position does not match the second assigned vertical position.

11. A method for measuring a pitch static attitude of a head stack assembly comprising sliders using a tester comprising a laser transmitter that transmits laser beams to a laser receiver, a zero reference plane, a tower reference plane defining an aperture, and a controller, wherein the head stack assembly is placed between the laser transmitter and the laser receiver and the zero reference plane and the tower reference plane are placed between the laser transmitter and the laser receiver, the method comprising:
determining a zero axis using the zero reference plane and the laser beams;
determining a first horizontal position of the aperture and a second horizontal position of the aperture using the zero axis and the laser beams;
determining a mid-point of a first slider of the head stack assembly using the first horizontal position and the second horizontal position;
determining a first vertical position of the aperture using the zero axis and the laser beams;
determining a first horizontal line using the first vertical position; and
generating, using the controller, a pitch static attitude reference line corresponding to a pitch static attitude of the first slider based on a least squares approximation using the mid-point of the first slider and the first horizontal line.

12. The method of claim 11 wherein the zero reference plane and the tower reference plane are integrally formed.

13. The method of claim 11 wherein the first horizontal position is located in a horizontal direction opposite the second horizontal position.

14. The method of claim 11 further comprising:
determining whether the first horizontal position matches a first assigned horizontal position; and
indicating a tester failure when the first horizontal position does not match the first assigned horizontal position.

15. The method of claim 11 further comprising:
determining whether the second horizontal position matches a second assigned horizontal position; and
indicating a tester failure when the second horizontal position does not match the second assigned horizontal position.

16. The method of claim 11 further comprising:
determining whether the first vertical position matches a first assigned vertical position; and
indicating a tester failure when the first vertical position does not match the first assigned vertical position.

17. The method of claim 11 further comprising:
determining a mid-point of a second slider of the head stack assembly using the first horizontal position and the second horizontal position;
determining a second vertical position of the aperture using the zero axis and the laser beams;
determining a second horizontal line using the second vertical position; and
generating a pitch static attitude reference line corresponding to a pitch static attitude of the second slider based on a least squares approximation using the mid-point of the second slider and the second horizontal line.

18. The method of claim 17 wherein the first vertical position is located in a vertical direction opposite the second vertical position.

19. The method of claim 17 wherein the second slider is located in a vertical direction opposite the first slider.

20. The method of claim 17 further comprising:
determining whether the second vertical position matches a second assigned vertical position; and
indicating a tester failure when the second vertical position does not match the second assigned vertical position.

* * * * *